United States Patent [19]

Lupinski et al.

[11] Patent Number: 5,310,933

[45] Date of Patent: May 10, 1994

[54] METHOD FOR PREPARING POLYIMIDES FOR USE IN ELECTRONIC APPLICATIONS

[75] Inventors: John H. Lupinski, Scotia; Paul E. Howson, Latham, both of N.Y.

[73] Assignee: General Electric Company, Schenectady, N.Y.

[21] Appl. No.: 960,324

[22] Filed: Oct. 13, 1992

[51] Int. Cl.⁵ .......................................... C07D 405/12
[52] U.S. Cl. .................................................. 548/461
[58] Field of Search ........................................ 548/461

[56] References Cited

FOREIGN PATENT DOCUMENTS 0254994  2/1988  European Pat. Off. ............ 548/461
3105852 12/1981  Fed. Rep. of Germany ...... 548/461

*Primary Examiner*—Mary C. Lee
*Assistant Examiner*—Jacqueline Haley
*Attorney, Agent, or Firm*—Brian J. Rees; Geoffrey H. Krauss

[57] ABSTRACT

Polyimides useful in electronic applications are prepared by the reaction of at least one aromatic tetracarboxylic acid or functional derivative thereof with at least one diamine in benzonitrile solution. The preferred tetracarboxylic acid derivative and diamine are 2,2-bis[4-(3,4-dicarboxyphenoxy)phenyl]propane dianhydride and bis(4-aminophenyl) sulfone, respectively. A second organic liquid, such as toluene, which is miscible with and has a lower boiling point than benzonitrile and which preferably forms an azeotropic mixture with water, is preferably also present.

12 Claims, No Drawings

METHOD FOR PREPARING POLYIMIDES FOR USE IN ELECTRONIC APPLICATIONS

This invention relates to the preparation of polyimides, and more particularly to the preparation of polyimides useful in electronic applications.

Polyimides are a well known class of high performance polymers, typically prepared by the reaction of at least one tetracarboxylic acid or functional derivative thereof with at least one diamine. They are employed in electronic packages in various ways; for example, as adhesives for securing integrated circuit chips to substrates, and as dielectrics in circuit overlays in contact with conductive metal traces. There are numerous stringent property requirements for polyimides which are to be so used. These include non-corrosiveness toward the conductive traces and the absence of volatile materials which, if present, could cause blistering during heating operations employed during the manufacture of the electronic unit.

Illustrative of the polyimides employed in this way are the polyetherimides prepared by the reaction of 2,2-bis[4-(3,4-dicarboxyphenoxy)phenyl]propane dianhydride (hereinafter "BPADA") with bis(4-aminophenyl) sulfone (hereinafter "SDAN"). By reason of the high melt viscosity of BPADA/SDAN polyetherimides at high molecular weight, it is usually necessary to prepare them in solution rather than in the melt. However, solvents for high molecular weight polyimides such as the BPADA/SDAN polyetherimides are difficult to find.

Two common solvents for this purpose are N-methylpyrrolidone and o-dichlorobenzene. Their use introduces difficulties, however, when use of the polyimide in an electronic package is desired. N-Methylpyrrolidone is difficult to remove in its entirety from the formed polyimide, and traces thereof which remain may cause blistering. Chlorinated solvents such as o-dichlorobenzene are also hard to remove, and the chlorine therein can cause corrosion of conductive traces comprising aluminum or a similar metal.

The present invention is based on the discovery that benzonitrile is an excellent solvent for polyimides and their precursors. It is easily removed after polyimide formation, whereby blistering is suppressed. Moreover, the absence of chlorine therefrom eliminates the risk of corrosion of conductive metal traces.

Accordingly, the invention is a method for preparing a polyimide which comprises contacting at least one aromatic tetracarboxylic acid or functional derivative thereof with at least one diamine in the presence of benzonitrile under conditions promoting the reaction of said acid or derivative thereof with said diamine, the proportion of benzonitrile being effective to dissolve said acid or derivative thereof, said diamine and said polyimide.

The polyimide-forming reagents employed in the method of this invention are at least one aromatic tetracarboxylic acid or functional derivative thereof and at least one diamine. Functional derivatives may include acid halides, anhydrides and esters. Acid halides and esters are usually not employed for this purpose because of their difficulty and high cost of preparation and, in the case of halides, the necessity for the polyimide to be substantially halide-free. The preferred acid reagents are the free tetracarboxylic acids and their dianhydrides, with dianhydrides being especially preferred by reason of their ease of preparation and particular suitability.

Suitable dianhydrides include those having the formula

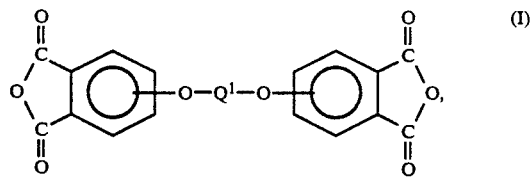

wherein $Q^1$ is a divalent unsubstituted or substituted aromatic hydrocarbon radical. Radicals derived from benzene, diphenyl or a diphenyl alkane are generally present, with the following being preferred:

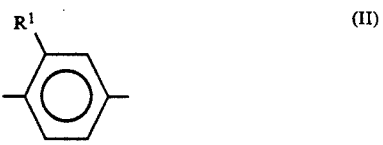

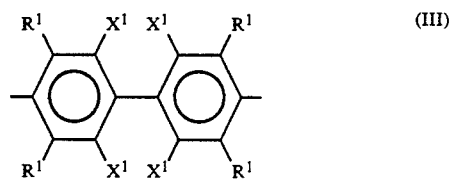

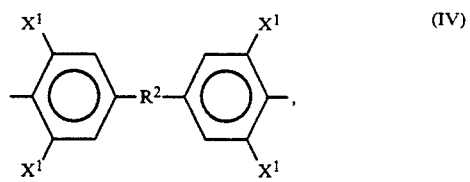

wherein each $R^1$ is independently hydrogen or methyl, $R^2$ is a straight-chain or branched alkylene radical containing 1-5 carbon atoms and is most often the isopropylidene radical, and each X is independently hydrogen or halogen (usually chlorine or bromine). Mixtures of dianhydrides of formula I are also contemplated. Especially preferred are the 2,2-bis[4-(dicarboxyphenoxy)-phenyl]propane dianhydrides, and most especially the 3,4-dicarboxy isomer (BPADA).

Suitable diamines may be represented by the formula

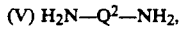

wherein $Q^2$ is an aromatic radical containing about 6–20 carbon atoms, a halogenated derivative thereof, an alkylene or cycloalkylene radical containing about 2–20 carbon atoms or a bis-alkylene poly(dialkylsiloxane) radical. Illustrative diamines are ethylenediamine, propylenediamine, trimethylenediamine, diethylenetriamine, triethylenetetramine, heptamethylenediamine, octamethylenediamine, 2,11-dodecanediamine, 1,12-octadecanediamine, 3-methylheptamethylenediamine, 4,4-dimethylheptamethylenediamine, 5-methylnonamethylenediamine, 2,5-dimethylhexamethylenediamine, 2,2-dimethylpropylenediamine, N-methyl-bis(3-aminopropyl)amine, 3-methoxyhexamethylenediamine, 1,2-bis(3-aminopropoxy)ethane, bis(3-aminopropyl) sulfide, 1,4-cyclohexanediamine, bis-(4-aminocyclohexyl)methane, m-phenylenediamine, p-phenylenediamine, 2,4-diaminotoluene, 2,6-diaminotoluene, m-xylylenediamine, p-xylylenediamine, benzidine, 3,3'-dimethylbenzidine, 3,3'-dimethoxybenzidine, 1,5-diaminonaphthalene, bis(4-aminophenyl)methane, bis(4-aminophenyl)propane, 2,4-bis($\beta$-amino-t-butyl)toluene, bis(p-$\beta$-methylo-aminopentyl)benzene, 1,3-diamino-4-isopropylbenzene, bis(4-aminophenyl) sulfone (SDAN), 4-aminophenyl ether and bis(3-aminopropyl)tetramethyldisiloxane. Mixtures of these diamines may also be used. Aromatic diamines are usually preferred. Particularly preferred, by reason of the adaptability of the present invention thereto, is SDAN.

For the sake of brevity, reference hereinafter will be made to BPADA and SDAN as the polyimide-forming reactants. It should be understood, however, that other compounds may be substituted therefor when desired.

The essential feature of the present invention is the employment of benzonitrile as a solvent for the polyimide-forming reaction. As previously mentioned, its use is particularly advantageous because it can be easily removed from the product substantially in its entirety and without leaving traces of chlorine or other halogen behind. Moreover, it is an excellent solvent for the reactants and for the product polyimide, even when the latter is of very high molecular weight. This is especially true of BPADA/SDAN polyetherimides.

The proportion of benzonitrile in the reaction mixture is an effective proportion to dissolve the reactants and product. In general, the proportion of solvent is such as to provide about 60–90% by weight based on total solvent, BPADA and SDAN.

It is usually preferred to employ dry, purified benzonitrile in the polyimide-forming reaction. The use of benzonitrile which is substantially dry and free from impurities such as amines permits preparation of a polymer of higher molecular weight and substantially less color than is obtained by the use of less pure solvent. Conventional drying/purification methods, such as contact with a dehydrating agent, a mildly reactive hydride or a molecular sieve, may be employed, usually followed by distillation.

The reaction mixture may contain other materials in addition to the BPADA and SDAN. Typical other materials are catalysts such as 4-dimethylaminopyridine or an alkali metal phenylphosphinate and endcapping agents such as aniline or phthalic anhydride. The proportions thereof will be apparent to those skilled in the art familiar with the polyimide-forming reaction. Other tetracarboxylic acids or derivatives thereof and/or diamines may also be present, if copolyimide formation is desired.

The reagents are brought into contact under conditions promoting polyimide formation. Such conditions will be apparent to those skilled in the art. They generally include substantially equimolar proportions of tetracarboxylic acid or derivative thereof and diamine, although a slight excess of one or the other may be employed in order to compensate for the endcapping agent. Reaction temperatures in the range of about 110°–200° C. are typical, with about 120°–140° C. being preferred.

In a preferred embodiment of the invention, a second organic liquid which is miscible with and has a lower boiling point that benzonitrile is also present in the reaction mixture. The presence of such a liquid has several effects. First, it makes it possible to maintain the reaction temperature within the preferred range when the reaction is conducted under reflux, thus suppressing side reactions and improving the color and increasing the molecular weight of the product polyimide. Second, it facilitates separation of water of reaction from the benzonitrile removed by distillation; although benzonitrile and water are substantially immiscible, they have nearly the same density and can be diffuiculat to seperete.

The preferred second organic liquids are those which form an azeotropic mixture with water, and they are preferably employed in an amount sufficient for removal of all of the water formed in the reaction, thus driving polyimide formation to completion. Examples of such liquids are toluene and xylene.

Following completion of the polyimide-forming reaction, the polymer may be recovered by conventional means. This typically includes non-solvent precipitation, filtration and washing.

The method of this invention is illustrated by the following examples. Intrinsic viscosities were determined in chloroform at 25° C.

EXAMPLE 1

A 500-ml. round-bottomed flask fitted with a distillation trap was charged with a mixture of 50 grams (96.1 mmol.) of BPADA, 24 grams (96.8 mmol.) of SDAN, 225 mg. (1.5 mmol.) of phthalic anhydride, 965 mg. of 4-dimethylaminopyridine and 252.5 grams of reagent grade benzonitrile, and the mixture was heated under nitrogen. At about 50°–60° C., a precipitate formed, presumably polyamic acid intermediate. The mixture became homogeneous at 105° C., and at 115° C. water of reaction began to condense in the trap. Toluene, 43.3 grams, was added and the distillate gradually separated into two phases. Heating was continued at 160° C. for 24 hours, with water of reaction being collected in the trap and removed. The viscosity of the solution progressively increased during this period.

The mixture was cooled to 20° C. and stored under nitrogen for 48 hours, during which time it remained homogeneous. An additional 21.7 grams of toluene was added and the reaction was continued at about 168° C. for an additional 25 hours, with addition of 25.3 grams of benzonitrile to reduce viscosity.

After 56 hours, the mixture was diluted with an additional 90.9 grams of benzonitrile and cooled to room temperature. The BPADA/SDAN polyetherimide was precipitated by pouring the reaction mixture into three liters of well agitated methanol. It was collected by filtration, washed in 2 liters of fresh methanol, refiltered and dried at 100°–125° C. under vacuum. The yellowish product has an intrinsic viscosity of 0.57 dl./g. and a chloride ion content of 4 ppm.

EXAMPLE 2

The procedure of Example 1 was repeated, except that the benzonitrile was first dried and purified by shaking with silica gel, stirring with calcium hydride for 2 hours, decanting and vacuum distilling from phosphorus pentoxide. All the benzonitrile and toluene employed in the reaction, 138.4 grams and 118.6 grams, respectively, were added at the beginning of the reaction, resulting in a maximum reaction temperature of 135° C. The product was an off-white polyetherimide having an intrinsic viscosity of 0.69 dl./g. and containing 3.3 ppm. of chloride ion.

What is claimed is:

1. A method for preparing a polyimide which comprises contacting at least one aromatic tetracarboxylic acid or acid halide, anhydride or ester thereof with at least one diamine having the formula (V) $H_2N-Q^2-NH_2$.

wherein $Q^2$ is an aromatic hydrocarbon radical containing about 6–20 carbon atoms, a halogenated derivative thereof, an alkylene or cycloalkylene radical containing about 2–20 carbon atoms or a bis-alkylene poly(dialkylsiloxane) radical, in the presence of benzonitrile at a temperature in the range of about 110°–200° C., the proportion of benzonitrile being effective to dissolve said acid or derivative thereof, said diamine and said polyimide.

2. A method according to claim 1 wherein the tetracarboxylic acid derivative is 2,2-bis[4-(3,4-dicarboxyphenoxy)phenyl]propane dianhydride.

3. A method according to claim 2 wherein the diamine is bis(4-aminophenyl) sulfone.

4. A method according to claim 3 wherein a catalyst, selected from the group consisting of 4-dimethylaminopyridine and phenylphosphinate, is also present.

5. A method according to claim 3 wherein an endcapping agent is also present.

6. A method according to claim 5 wherein the endcapping agent is aniline or phthalic anhydride.

7. A method according to claim 3 wherein dry, purified benzonitrile is employed.

8. A method according to claim 3 wherein a second organic liquid which is miscible with and has a lower boiling point than benzonitrile is also present.

9. A method according to claim 8 wherein the second organic liquid is one which forms an azeotropic mixture with water.

10. A method according to claim 8 wherein the reaction temperature is in the range of about 120°–140° C.

11. A method according to claim 9 wherein the second organic liquid is toluene.

12. A method according to claim 1 wherein an aromatic tetracarboxylic acid anhydride is employed.

* * * * *